United States Patent Office 3,470,153
Patented Sept. 30, 1969

3,470,153
PROCESS FOR THE SIMULTANEOUS PRODUCTION OF EPSILON-CAPROLACTAM AND OMEGA-DODECALACTAM
Hans-Joachim Schultze, Chur, Walter Zbinden, Tamins Grisons, and Clau Berther, Chur, Switzerland, assignors to Inventa A.G. für Forschung und Patentverwertung, Zurich, Switzerland
No Drawing. Filed Nov. 3, 1966, Ser. No. 591,675
Claims priority, application Switzerland, Nov. 3, 1965, 15,156/55
Int. Cl. C07d 41/06, 41/00
U.S. Cl. 260—239.3           10 Claims

ABSTRACT OF THE DISCLOSURE

The invention relates to the simultaneous production of epsilon-caprolactam. More particularly, it relates to a common oximation of cyclododecanone and cyclohexanone, whereby the cyclohexanone oxime formed acts as a solvent for the cyclododecanone oxime which simultaneously forms. The two lactams then formed from these oximes are the monomers from which nylon-6 and nylon-12 are produced.

---

The manufacture of omega-dodecalactam is carried out by a Beckmann rearrangement of cyclododecanone oxime. Because of the high melting points of cyclododecanone oxime (133–134° C.) and of the omega-dodecalactam (152–153° C.), special precautions must be taken in large-scale production. Both substances named can be separated in pure and liquid form after oximation of the cyclododecanone and after the Beckmann rearrangement, respectively, but only when suitable pressures are applied. The separation in solid form is feasible by means of filtration or centrifuging, but is accompanied by microcrystallization and, hence, is difficult and not employed in industrial practice. Moreover, the filter cakes obtained thereby contain much water, frequently up to 30 weight percent, so that an additional drying step is required.

It has previously been suggested to employ separate solvents for the oximation and for the conversion of the lactam into a dissolved state after neutralization of the product obtained by the Beckmann rearrangement, or else to utilize solvents which are added prior to oximation and which are present in the reaction mixture during oximation and Beckmann rearrangement, and to be removed only upon refining of the finished crude omega-dodecalactam by distillation. The solvent then can be recycled into the process. Such solvents facilitate the handling of the high-melting oxime and lactam since they keep the cyclododecanone oxime as well as the omega-dodecalactam in liquid state at temperatures between 90 and 120° C., i.e., without the use of pressure or at very low positive pressure. The difficulties named above thereby are overcome.

The use of solvents which are present during oximation and Beckmann rearrangement, i.e., without temporary removal, is contingent on the condition that these solvents are sufficiently resistant to the aggressive medium wherein they are used, especially during the Beckmann rearrangement.

However, all solvents, no matter how suited they may be in all other respects, have the disadvantage that they are foreign substances within the entire process. The ideal solvent therefore is a material which fulfills its task as solvent or melting point depressant while simultaneously reacting analogously under the prevailing reaction conditions and which can readily be removed during the distillation which is the final refining step of the crude end product, or else may be used simultaneously during the polymerization of the omega-dodecalactam to nylon-12.

It is the object of this invention to disclose such a solvent. The demands made above are fulfilled in their entirety when cyclohexanone oxime is employed as solvent for the cyclododecanone oxime and epsilon-caprolactam is used as solvent for the omega-dodecalactam.

According to the invention, the oximation of cyclododecanone is carried out in the presence of cyclohexanone. This leads to the common formation of cyclododecanone oxime and cyclohexanone oxime. A liquid oxime mixture is obtained by suitable selection of the proportions of the materials named. Such suitable proportions of cyclohexanone to cyclododecanone or of cyclohexanone oxime to cyclododecanone oxime range from 70:30 to 30:70. Mixtures of such composition melt within 20 and 60° C. and 60–100° C., respectively. It goes without saying that mixtures also can be employed which are outside the range named; if the cyclododecanone oxime content is higher, slight pressure above atmospheric must be applied in order to maintain a liquid phase in spite of the higher melting point of the mixture.

There are two further advantages in the simultaneous formation of cyclohexanone oxime and cyclododecanone oxime, beside the melting point depression of the latter. One of these is the increase in the speed of oximation due to the solubilizing effect of the more hydrophilic cyclohexanone on the cyclododecanone, so the dwelling time during oximation is reduced as compared to the oximation of pure cyclododecanone. Secondly, the cyclododecanone oxime portion in the oxime mixture effects a lesser water acceptibility because of its hydrophobic properties. This in turn, leads to a lowering of the heat of reaction during the Beckmann rearrangement and thus to improved quality of the lactam thus obtained.

The oximation of the cyclohexanone and cyclododecanone mixture is carried out in the customary manner, i.e., at substantially 80–110° C. depending upon the weight proportions, using hydroxylamine salts and a pH of 3 to 6, and preferably of 4 to 5.

It is a known fact that the Beckmann rearrangement of cyclohexanone oxime to epsilon-caprolactam is quite adversely affected by the presence of foreign organic substances. This manifests itself by an increased yield of by-products and thus a distinct lowering of the quality of the epsilon-caprolactam produced. This quality decrease leads to polymers which technologically and industrially are unusable. Surprisingly and unexpectedly, it has been established that in the common reaction of cyclohexanone oxime and cyclododecanone oxime not only such lowering of the quality does not occur, but that contrariwise a better lactam is obtained than by a Beckmann rearrangement of cyclohexanone oxime alone.

The mixture obtained by the common oximation contains but little water and can be subjected to the Beckmann rearrangement directly or, if desired, following a water wash. Depending upon the water content of the mixture, concentrated sulfuric acid, sulfuric acid containing an excess of $SO_3$ and/or concentrated phosphoric acid can be used, and the latter also may contain an excess of $P_2O_5$. The weight proportions of the oxime mixture to acid depends upon the composition of the former and therefore is, e.g., between 1:1 and 1:2, and preferably between 1:1.1 and 1:1.4, for cyclohexanone oxime-cyclododecanone oxime mixtures of the composition of 30:70 to 70:30. The reaction temperature is 90–120° C. when using concentrated sulfuric acid or oleum, and preferably 100–110° C.

The most advantageous temperature range is 100–135° C. when using concentrated phosphoric acid which may contain an excess of $P_2O_5$, and preferably is 115–125° C. The oximation of the ketones and the rearrangement of the oximes can be carried out continuously or batchwise.

Since the average molecular weight of the oxime mixture approximately lies between those of epsilon-caprolactam and omega-dodecalactam, the rearrangement reaction is considerably milder than that of pure cyclohexanone oxime which is quite vehement. This avoids local overheating and charring during the rearrangement which, in turn, effects an improvement of the epsilon-caprolactam in the final mixture.

The rearrangement product is neutralized in the customary manner with ammonia, sodium hydroxide, or any other suitable agent. If the neutralization is carried out at substantially 80–100° C., the lactam mixture readily separates in liquid form as the upper layer from the salt water phase. In this step the omega-dodecalactam, due to its hydrophobic character, largely compensates for the undesirable property of the epsilon-caprolactam to dissolve in the aqueous phase and therefore renders the application of a solvent extractant for the latter unnecessary, which usually is dissolved in the aqueous phase. It is a particular advantage of the process according to the invention that the lactam mixtures resulting from the Beckmann rearrangement of the oxime mixtures and having the above-named composition also melt at approximately 60–110° C., i.e., that they are present in liquid form at the working temperature.

The mixture of epsilon-caprolactam and omega-dodecalactam is readily refined by distillation and can easily be separated into its component parts due to the large difference in boiling points. Caprolactam has a boiling point of 120° C. at 5 torr, dodecalactam boils at approximately 90° C. at 5 torr.

However, if a copolymer is to be produced from these two lactams, separation by distillation is not required when suitable proportions are present.

The process according to the invention therefore consists of the simultaneous oximation of cyclohexanone and cyclododecanone in mixture and subjecting the reaction product to a Beckmann rearrangement.

If a simultaneous production of epsilon-caprolactam and omega-dodecalactam is not desired, the former can be employed for the oximation of cyclododecanone as well as for the rearrangement of the oxime formed. It then is separated by distillation and recycled into the oximation.

The invention now will be further explained by the following examples. However, it should be understood that these are given by way of illustration, and not of limitation, and that modifications and changes may be made therein without departing from the spirit and the scope of the invention as hereinafter claimed.

The temperatures named in the examples are degrees centigrade, parts and percentages are by weight.

EXAMPLE 1

A mixture of 270 parts cyclohexanone and 330 parts cyclododecanone was reacted at 95–102° with one liter of an aqueous solution containing 450 parts hydroxylamine sulfate and adjusted to a pH of 4 with intense agitation.

The sulfuric acid liberated during oximation was neutralized continuously by addition of aqueous ammonia in such a manner that the pH constantly remained at approximately 4. The oximation was completed after 3 hours, and only traces of cyclohexanone and cyclododecanone were present in the oxime mixture. After separation from the aqueous phase, 675 g. of a mixture of cyclohexanone oxime and cyclododecanone oxime were obtained. This mixture was freed from residual water by drying at 100° for 30 minutes, and the yield was 661 parts oxime mixture, or 98.9 percent of theory.

The mixture of 661 parts cyclohexanone oxime and cyclododecanone oxime (45:55) was introduced with strong agitation into a mixture held at 95° and consisting of 45 parts epsilon-caprolactam, 55 parts omega-dodecalactam and 110 parts 100% sulfuric acid. Independently, 726 parts 100% sulfuric acid were introduced in such a manner that by simultaneous cooling of the reaction mixture the temperature was kept at 105–110°. After completion of the oxime and sulfuric acid addition, the product was kept at 105° for another 30 minutes and then neutralized while warm with an aqueous ammonia solution containing 40% ammonium sulfate. Above 90° the mixture of epsilon-caprolactam and omega-dodecalactam separated from the aqueous phase in liquid form and was removed therefrom. The distillation of the lactam mixture at reduced pressure yielded 322 g. epsilon-caprolactam (94.1% of theory) and 401 g. omega-dodecalactam (95.6% of theory).

EXAMPLE 2

330 parts cyclohexanone and 270 parts cyclododecanone were reacted with 500 parts hydroxylamine sulfate solution in 1.1 liters aqueous solution at a pH of 5 with constant addition of ammonia within 3 hours at 95–102° in the manner analogous to that described in Example 1. After separation of the phases and drying of the organic phase, 664 g. oxime mixture was obtained.

This mixture was added within 50 minutes at 100–110° into 55 parts epsilon-caprolactam, 45 parts omega-dodecalactam and 120 parts 100% sulfuric acid. The mixture thus obtained was kept for another 30 minutes at 105° C. and then refined as described in the preceding example. The yield was 324 g. omega-dodecalactam, or 96.1% of theory, and 409 g. epsilon-caprolactam, or 94.0% of theory, when the parts named were grams.

EXAMPLE 3

A mixture of 200 g. cyclohexanone oxime and 200 g. cyclododecanone oxime which had been produced by oximation of the corresponding ketone mixture as described in Example 1, had a water content of approximately 1.6% and was added without prior drying to 100 g. lactam mixture (1:1) in 120 g. sulfuric acid containing 6% excess $SO_3$, together with 480 g. sulfuric acid of the same kind. After completion of the addition, the product was allowed to react for another 30 minutes. The neutralization, refining and distillation steps were the same as described in the preceding examples. The yield of distilled lactam mixture was 96.3% of the theory, the still residue was 0.7%, calculated on the theoretically present quantity of lactam.

EXAMPLE 4

600 g. of a mixture of equal parts cyclohexanone oxime and cyclododecanone oxime, produced as described above, were incorporated within 60 minutes, together with 900 g. 100% phosphoric acid of 90°, into a mixture of 30 g. epsilon-caprolactam, 30 g. omega-dodecalactam and 90 g. 100% phosphoric acid at 115–120° C. The mixture was allowed to react for another 30 minutes at 120°, then was neutralized and refined by distillation. 320 g. caprolactam (96.9% of theory) and 322 g. dodecalactam (97.6% of theory) were obtained.

EXAMPLE 5

500 g. of a cyclohexanone oxime-cyclododecanone oxime mixture having a water content of 1.7% were subjected to a Beckmann arrangement with simultaneous addition of 600 g. phosphoric acid containing 15% excess $P_2O_5$ to 150 g. of an equal parts mixture of epsilon-caprolactam and omega-dodecalactam within 40 minutes. The post-reaction time was 30 minutes. The yield was 268 g. caprolactam (95.8% of theory) and 263 g. dodecalactam (97.5% of theory).

We claim as our invention:

1. A process for the simultaneous production of epsilon-caprolactam and omega-dodecalactam which comprises simultaneous oximation of cyclohexanone and cyclododecanone, followed by subjecting the oxime mixture thus obtained to a Beckmann rearrangement.

2. The process as defined in claim 1, wherein cyclohexanone and cyclododecanone are used in weight proportions of 70:30 to 30:70.

3. The process as defined in claim 1, wherein the weight proportions of cyclohexanone oxime to cyclododecanone oxime are 30:70 to 70:30.

4. The process as defined in claim 1, wherein oximation is carried out at a pH of 3–6.

5. The process as defined in claim 1, wherein said Beckmann rearrangement is carried out with an acid selected from the group consisting of concentrated sulfuric acid, oleum, phosphoric acid, phosphoric acid containing an excess of $P_2O_5$, and mixtures thereof; the reaction temperature being 90–135° C.

6. The process as defined in claim 5, wherein the weight proportions of oxime mixture to said acid are 1:1 to 1:2.

7. The process as defined in claim 1, wherein said epsilon-caprolactam is separated from said omega-dodecalactam by distillation.

8. In a process for the production of omega-dodecalactam, wherein cyclododecanone is subjected to oximation and the oxime formed subjected to a Beckmann rearrangement, the improvement which comprises carrying out said oximation and rearrangement in the presence of epsilon-caprolactam as solvent; followed by distillation of said solvent which then is used in a new batch.

9. A process for the simultaneous production of epsilon-caprolactam and omega-dodecalactam, which comprises simultaneous oximation of cyclohexanone and cyclododecanone in weight proportions of 70:30 to 30:70 at a pH of 3–6 temperatures of substantially 80–110° C.: and subjecting the oximes thus obtained to a Beckmann rearrangement with an acid selected from the group consisting of concentrated sulfuric acid, oleum, phosphoric acid, phosphoric acid containing an excess of $P_2O_5$, and mixtures thereof, at temperatures of substantially 90–135° C.; the weight proportions of said oximes to said acid being 1:1 to 1:2.

10. The process as defined in claim 9, wherein the lactam mixture thus obtained is separated into epsilon-caprolactam and omega-dodecalactam by distillation.

References Cited

UNITED STATES PATENTS

| | | | |
|---|---|---|---|
| 2,249,177 | 7/1941 | Schlack | 260—239.3 |
| 2,313,026 | 3/1943 | Schlack | 260—239.3 |
| 2,579,851 | 12/1951 | Novotny | 260—239.3 |
| 3,016,375 | 1/1962 | Hopkins et al. | 260—239.3 |
| 3,060,173 | 10/1962 | Von Schickh et al. | 260—239.3 |
| 3,094,520 | 6/1963 | Hopkins | 260—239.3 |

HENRY R. JILES, Primary Examiner

R. T. BOND, Assistant Examiner